United States Patent [19]

Dugas

[11] Patent Number: 5,226,999
[45] Date of Patent: Jul. 13, 1993

[54] METHOD FOR REMOVING THE TREND FROM TIRES

[75] Inventor: Hubert Dugas, Riom, France

[73] Assignee: Compagnie Generale des Etablissements Michelin - Michelin & Cie, Clermont-Ferrand Cedex, France

[21] Appl. No.: 879,595

[22] Filed: May 7, 1992

[30] Foreign Application Priority Data

May 23, 1991 [FR] France .................. 91 06255

[51] Int. Cl.⁵ ............................................ B28D 30/54
[52] U.S. Cl. ................................... 156/344; 156/96
[58] Field of Search ............... 156/96, 344, 247, 254; 152/531, 533

[56] References Cited

U.S. PATENT DOCUMENTS

| | | | |
|---|---|---|---|
| 1,459,693 | 6/1923 | Rand et al. | 156/344 |
| 1,869,680 | 8/1932 | Freeman | 156/344 |
| 2,610,868 | 9/1952 | Flament | 156/344 |
| 4,498,514 | 2/1985 | Maathuis et al. | |
| 4,989,658 | 2/1991 | Maathuis et al. | |

FOREIGN PATENT DOCUMENTS

| | | | |
|---|---|---|---|
| 385237 | 3/1988 | Austria . | |
| 12831 | 1/1984 | Japan | 156/344 |

*Primary Examiner*—Geoffrey L. Knable
*Attorney, Agent, or Firm*—Brumbaugh, Graves, Donohue & Raymond

[57] ABSTRACT

The removal of the tread consists in grasping a zero-degree reinforcement cord, which the crown of the tire must necessarily contain in order to apply this method, and pulling transversely on it until it is completely removed from the tire. In this way, the tread is very easily separated from the carcass of the tire.

6 Claims, 1 Drawing Sheet

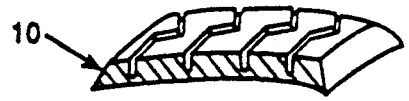
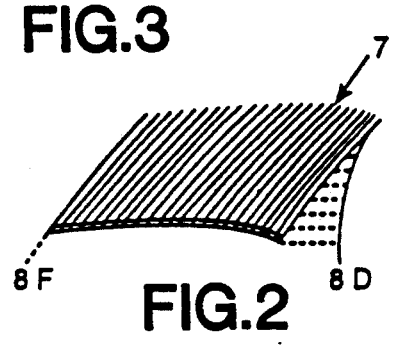
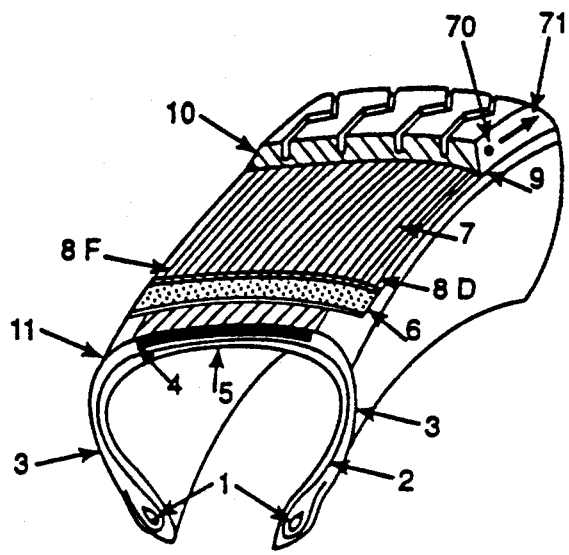
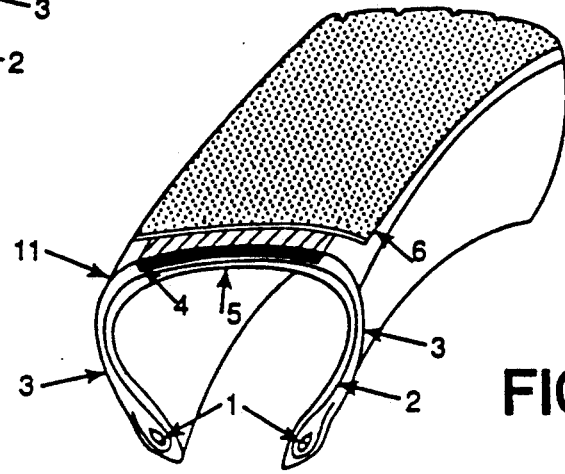
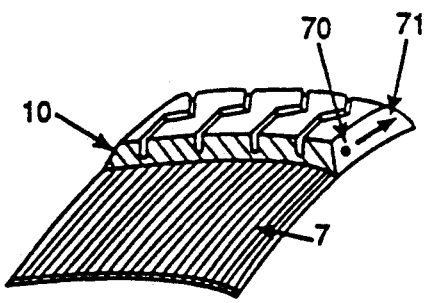
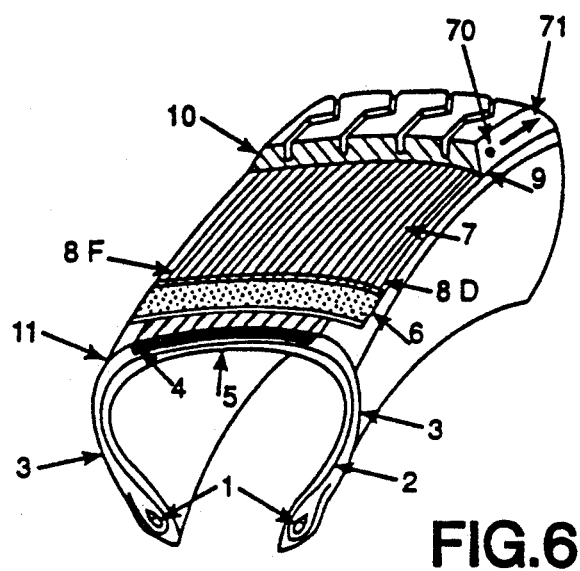

METHOD FOR REMOVING THE TREND FROM TIRES

BACKGROUND OF THE INVENTION

The present invention relates to the recapping of tires; more particularly, it proposes a new method of removing the tread from tires, that is to say, a new method of removing a worn tread before recapping.

Tires have a crown reinforcement, generally arranged above the carcass ply of the tire. More and more frequently these crown reinforcements have a reinforcement arranged at zero angle, that is to say, oriented in the circumferential direction of the tire so as to constitute a hoop. The latter may be arranged either over the entire width of the crown of the tire or over a part thereof, for instance over the side edges. It is possible to develop these zero-degree reinforcements in various ways. For example, a ply is produced, the width of which corresponds to the width of the zero-degree reinforcement, by winding in one or more turns and forming a splice by a slight superpositioning of the circumferential ends of the ply. Another technique consists in using a strip comprising a plurality of parallel cords, for instance ten, and winding this strip until obtaining the desired reinforcement.

A zero-degree reinforcement can also be formed from a single cord which is wound on the crown of the tire in order to produce the desired reinforcement. In these latter two cases, the cord is not placed exactly at zero degree since there is a very small angle corresponding to the laying pitch of the cord. However, it is customary to speak of all these embodiments as having a zero degree angle.

In the present description, the expression "cord" is to be understood in the very broadest sense; a reinforcement cord is formed either by a single cord or by an assembly constituting a cable, or by any equivalent type of assembly, and this whatever the nature of the cord.

Before proceeding with the recapping of a tire, it is necessary to remove what remains of the tread which has been used. In order to remove the tread, one effects a machining operation with a cutting tool until freeing the carcass of the tire from any trace of tread rubber. This operation is well known to those skilled in the art.

SUMMARY OF THE INVENTION

The present invention proposes a new manner of removing the worn tread for the preparation of the carcass for recapping. In order to remove the tread, it is proposed to use the zero-degree cord when the crown reinforcement has one. In fact, it has been found that the tread of a tire, the crown reinforcement of which contains a spirally wound zero-degree cord over the entire width of said crown, can be removed by grasping at least one of the ends of said cord and pulling it in the direction transverse to said cord in order to remove it completely from the crown reinforcement. A zero-degree reinforcement formed by a single cord wound on the crown lends itself perfectly to the removal of the tread in accordance with the present invention.

It is also noted that zero-degree reinforcements formed from a strip also lend themselves to this new method of tread removal, and this even better when the strip comprises a small number of cords, for instance three cords. In this case, all the cords of the strip must be grasped simultaneously in order to remove the tread by pulling in transverse direction on the cords.

In the following description, the expression "single cord" specifically designates a zero-degree reinforcement produced with a single assembly or unit cord; otherwise, the expression "cord" covers both a single cord and a strip formed of a small number of cords.

This tread removing method can furthermore be used when the zero-degree cord has undulations forming approximately sinusoids in the reinforcement plane, as is well known in the case of protective plies used, for instance, in airplane tires.

DESCRIPTION OF THE DRAWING

The accompanying figures illustrate the invention applied to tread removal by means of a single non-undulated cord wound with zero degree.

FIG. 1 is a view showing the layers of a tire section before removal of the tread;

FIG. 2 diagrammatically shows the tread removal operation;

FIGS. 3 and 4 show what is obtained after the detachment of the tread, namely the tread (FIG. 3) and the carcass ready for recapping (FIG. 4);

FIG. 5 is a view of a precured tread, incorporating a zero-degree reinforcement, intended for subsequent use in the recapping method of the invention;

FIG. 6 is a view showing a section of the recapped tire.

DESCRIPTION OF PREFERRED EMBODIMENTS

The accompanying drawings show a tire having two side walls 3 and a tread 10, the tire being reinforced by a carcass ply 2 anchored to two bead wires 1.

There can also be noted two crown plies 4 and 5 forming with the carcass ply 2 the classical triangulated belt of most radial tires. The tire has a layer of rubber 6 covering the crown plies 4 and 5 and a zero-degree crown reinforcement produced by a single cord 7 wound from a starting point 8D on one of the shoulders of the tire across to the opposite end 8F on the other shoulder of the tire.

The zero-degree cord 7, wound continuously to form the crown reinforcement, constitutes potentially the means for separating the tread 10 (which is located above this zero-degree cord 7) from the carcass 11 of the tire (which is below the zero-degree cord). For the thicknesses of rubber currently present between two adjacent cords 7, the pulling force in the transverse direction, that is to say, in the direction approximately perpendicular to the initial direction of the cord, is relatively slight to the extent that it is very easy to tear off the cord manually. This operation is diagrammatically indicated in FIG. 2. On the other hand, at the level of the shoulders of the tire, the thickness of rubber present between the surface of the tire at the shoulder and the first zero-degree cord 7 may well be too great to be sheared by the pull on the cord 7. In this case, rubber is removed from a shoulder of the tire by a cutting tool until reaching the end of the zero-degree cord 7. After the removal of the tread by this method, one obtains the carcass 11 ready to be recapped, as shown in FIG. 4.

It may happen that this tread removal operation is interrupted by a cut in the cord 7. In such case, it is easy to find the new end of the cord 7 with a cutting tool before resuming the extracting thereof.

It is, of course, possible to adapt the design of the reinforcement structure of the tire to the use which is made of the zero-degree cord for the tread removal and to do this at the time of the manufacture of the new tire. In such case, the zero-degree cord will be arranged from one edge to the other, leaving the smallest possible thickness of rubber between the last cord and the surface of the tire at the shoulder. If this is not done, then, upon the recapping of said tire, after having started the removal of the tread by a machining operation, it is continued by pulling on the zero-degree cord, and the separation of tread and carcass is completed by means of a cutting tool.

In order to facilitate the use of the method of tread removal in accordance with the invention, the tire, the crown reinforcement of which contains a zero-degree cord wound from one side to the other of said crown, is characterized by the fact that the position of at least one of the ends of said cord which is arranged at zero degree is marked on the shoulder of the tire.

This marking is of very particular interest when it is possible to remove the tread completely by pulling on the zero-degree cord, which is always true when the zero-degree cord is flush with the surface of the tire at its shoulder. In order further to facilitate the extraction of the zero-degree cord, it is advantageous to mark the direction of the zero-degree winding on the shoulder of the tire. In fact, the tearing off of the cord is facilitated when the cord is inclined slightly in the direction of winding.

For the recapping of the carcasses 11, it is possible also to produce premolded annular treads the sole of which comprises, over its entire width, a zero-degree cord which is spirally arranged and embedded just below the surface of said sole. One embodiment of such annular treads consists, for instance, in applying a layer of unvulcanized rubber mix of slight thickness onto the outer surface of a cylindrical or quasi-cylindrical form, winding a single zero-degree cord on said layer from a starting point 8D on a lateral side of the layer up to the opposite end 8F on the other lateral side, putting the unvulcanized rubber mix corresponding to the tread in place, placing the said assembly in an annular sculpture mold and vulcanizing the assembly. It is advantageous to mark the position 70 (FIG. 5) and the starting direction 71 of at least one of the ends of the zero-degree cord on the lateral side of said tread. Thus, when the tread has been attached to a carcass 11 by a recapping operation, one knows the point 70 where the extraction of the zero-degree cord is to start for a subsequent tread removal operation.

A second embodiment of a zero-degree crown reinforcement suitable for the invention consists in winding a single cord 7 in two parts from the starting points 8D and 8F on the shoulders of the tire with the same direction of winding to the center of said crown of the tire.

In this case, the tread removal operation consists, simultaneously or successively, in grasping the two ends 8D and 8F and exerting a transverse pulling force until the single reinforcement cord 7 is completely extracted.

The advantage of this second embodiment of the zero-degree crown reinforcement over the first is that it permits faster removal of the tread while also being easy to carry out.

Of course, this second embodiment of a zero-degree crown reinforcement suitable for the invention can be included in the manufacture of new tires. It is then preferable to mark the two ends 8D and 8F of the two windings, as well as their common direction of winding, on the shoulders of the tires.

In the same way, it is also possible to produce premolded annular treads with the incorporation within them of a reinforcement cord wound in two parts from the two sides of the sole of the tread up to its center, marking on the side walls of said tread the starting positions of the zero-degree cord as well as the direction of winding thereof.

Prior to the present invention, prior removal of the tread and preparation of the carcass always required the use of rather expensive equipment in order to carry out a machining operation on the carcass. Due to the present invention, the prior removal of the tread of the carcass is a very easy operation. It is therefore possible to shift the recapping to the car maintenance shops. One can thus provide for very frequent tread removal and recapping, for instance when the tread pattern is more than 50% worn. It is well known that the water drainage capacity declines very greatly as the tread pattern becomes worn. One can therefore contemplate using the carcass of the tire several times and replacing the tread of the tire as frequently as necessary, for instance in order to change from a summer tread to a winter tread.

I claim:

1. A method of removing the tread of a tire having a carcass and a crown reinforcement which has a spirally wound zero-degree cord over the entire width of said crown, comprising grasping at least one end of said cord and exerting a pull in transverse direction on said cord in order to extract said cord completely from the crown reinforcement thereby separating the tread from said carcass.

2. A method of removing the tread according to claim 1, characterized by the fact that rubber is removed from at least one shoulder of the tire by means of a cutting tool until reaching the end of the zero-degree cord.

3. A method of removing the tread according to claim 1, characterized by the fact that, after extraction of the zero-degree cord, the separation of the tread and carcass is completed by use of a cutting tool.

4. A method of removing the tread according to claim 1, wherein the zero-degree crown reinforcement is made from a single cord.

5. A method of removing the tread according to claim 1, characterized by the fact that the zero-degree crown reinforcement is a single cord wound from a starting point on a shoulder of the tire to the opposite end on the other shoulder of the tire.

6. A method of removing the tread, according to claim 1, characterized by the fact that the zero-degree crown reinforcement is a single cord wound in two parts, from starting points and on the shoulders of the tire with the same direction of winding to the center of said crown of the tire.

* * * * *